United States Patent
Turner et al.

(10) Patent No.: US 12,407,523 B2
(45) Date of Patent: Sep. 2, 2025

(54) PRIVACY-PRESERVING ACTIVITY AGGREGATION MECHANISM

(71) Applicant: Google LLC, Mountain View, CA (US)

(72) Inventors: David Bruce Turner, Newark, CA (US); Adrian John Isles, Oakland, CA (US); Philipp Helmut Pfeiffenberger, San Francisco, CA (US)

(73) Assignee: Google LLC, Mountain View, CA (US)

( * ) Notice: Subject to any disclaimer, the term of this patent is extended or adjusted under 35 U.S.C. 154(b) by 264 days.

(21) Appl. No.: 17/798,604

(22) PCT Filed: Mar. 3, 2021

(86) PCT No.: PCT/US2021/020694
§ 371 (c)(1),
(2) Date: Aug. 10, 2022

(87) PCT Pub. No.: WO2022/186831
PCT Pub. Date: Sep. 9, 2022

(65) Prior Publication Data
US 2023/0163978 A1     May 25, 2023

(51) Int. Cl.
*H04L 9/32* (2006.01)
*H04L 9/40* (2022.01)

(52) U.S. Cl.
CPC .......... *H04L 9/3263* (2013.01); *H04L 9/3247* (2013.01); *H04L 9/3297* (2013.01); *H04L 63/0421* (2013.01)

(58) Field of Classification Search
CPC .. G06F 21/6245; G06F 21/6254; G06F 21/33; G06F 16/906; G06F 16/90; H04L 9/3247; H04L 9/3263; H04L 9/3297
See application file for complete search history.

(56) References Cited

U.S. PATENT DOCUMENTS

2008/0141025 A1   6/2008 Noble
2008/0273610 A1* 11/2008 Malladi ................. H04L 1/0032
                                                            375/260
(Continued)

FOREIGN PATENT DOCUMENTS

| CN | 108696349 | 10/2018 |
|---|---|---|
| CN | 109447646 | 3/2019 |

(Continued)

OTHER PUBLICATIONS

Office Action in Japanese Appln. No. 2022-554359, mailed on Dec. 4, 2023, 4 pages (with English translation).

(Continued)

*Primary Examiner* — Lesa M Kennedy
(74) *Attorney, Agent, or Firm* — Fish & Richardson P.C.

(57) ABSTRACT

This disclosure relates to a method for privacy-preserving web activity monitoring including receiving, from an application on a user device of a user, a request for digital content from a domain, assigning, to the application and at a first time, a randomized cohort constructed based on a randomly selected identifier and a timestamp indicating the first time at which the randomized cohort was assigned to the application, and providing, to the application and at the first time, (i) a digitally signed certificate corresponding to the randomly selected identifier and the timestamp and (ii) a unique public key and corresponding unique private key associated with the certificate, wherein the randomly selected identifier is also assigned to at least a threshold number of other applications executing on other user devices within a predetermined period of time of the assignment of the randomized cohort to the application.

18 Claims, 6 Drawing Sheets

(56) References Cited

U.S. PATENT DOCUMENTS

| | | | |
|---|---|---|---|
| 2016/0366180 A1* | 12/2016 | Smith | ............ H04W 4/70 |
| 2019/0089547 A1 | 3/2019 | Simplicio, Jr. et al. | |

FOREIGN PATENT DOCUMENTS

| | | | |
|---|---|---|---|
| CN | 111066286 | 4/2020 | |
| EP | 2026231 A1 * | 2/2009 | ............ G06F 21/10 |
| JP | 2017-504885 | 2/2017 | |
| JP | 2017-507387 | 3/2017 | |
| JP | 2019-008820 | 1/2019 | |
| KR | 10-1494588 | 2/2015 | |
| KR | 10-2017-0021874 | 2/2017 | |
| KR | 10-2019-0050691 | 5/2019 | |
| WO | WO 2021030545 | 2/2021 | |

OTHER PUBLICATIONS

Notice of Allowance in Japanese Appln. No. 2022-554359, mailed on Mar. 18, 2024, 5 pages (with English translation).

International Preliminary Report on Patentability in International Appln. No. PCT/US2021/020694, mailed on Sep. 14, 2023, 8 pages.

Abe et al., "Provably Secure Partially Blind Signatures." Advances in Cryptology—CRYPTO 2000, Aug. 2000, 272-287.

Hooi et al., "FRAUDAR: Bounding Graph Fraud in the Face of Camouflage." KDD '16, San Francisco, CA, USA, Aug. 13-17, 2016, 10 pages.

International Search Report and Written Opinion in International Appln. No. PCT/US2021/020694, dated Nov. 3, 2021, 14 pages.

Wikipedia.org [online], "Relative Risk" created on Sep. 2005, retrieved on Dec. 2020, retrieved from URL <https://en.wikipedia.org/w/index.php?title=Relative_risk&oldid=994506004>, 5 pages.

Office Action in Indian Appln. No. 202227046766, mailed on Sep. 11, 2024, 6 pages (with English translation).

Office Action in Korean Appln. No. 10-2022-7030754, mailed on Oct. 14, 2024, 13 pages (with English translation).

Office Action in Chinese Appln. No. 202180019433.X, mailed on Nov. 30, 2024, 13 pages (with English translation).

Notice of Allowance in Korean Appln. No. 10-2022-7030754, mailed on Jun. 19, 2025, 13 pages (with English translation).

* cited by examiner

PRIVACY-PRESERVING ACTIVITY AGGREGATION MECHANISM

CROSS-REFERENCE TO RELATED APPLICATIONS

This application is a National Stage Application under 35 U.S.C. § 371 and claims the benefit of International Application No. PCT/US2021/020694, filed Mar. 3, 2021, the entirety of which is incorporated herein by reference.

TECHNICAL FIELD

This specification relates to web activity aggregation, data processing, and protecting user privacy in an online environment. The enhancement of online user privacy has led many browser developers to change the ways in which user data is handled. For example, some types of cookies are no longer being supported by some browsers, but the deprecation of third party (3P) cookies may lead to fraud and abuse.

BACKGROUND

Aggregating web activity allows personalization of the browsing experience for a user, and enables delivery of content that is more relevant to a user, faster, than without monitoring. However, existing mechanisms such as cookies can be linked to a single user and information about the user. Such precision can make users feel like they can be too easily identified and their information is too easily compromised.

SUMMARY

In general, one innovative aspect of the subject matter described in this specification can be embodiment in a method for privacy-preserving web activity monitoring that includes receiving, from an application on a user device of a user, a request for digital content from a domain, assigning, to the application and at a first time, a randomized cohort constructed based on a randomly selected identifier and a timestamp indicating the first time at which the randomized cohort was assigned to the application, and providing, to the application and at the first time, (i) a digitally signed certificate corresponding to the randomly selected identifier and the timestamp and (ii) a unique public key and corresponding unique private key associated with the certificate, wherein the randomly selected identifier is also assigned to at least a threshold number of other applications executing on other user devices within a predetermined period of time of the assignment of the randomized cohort to the application.

In some implementations, the method includes receiving, from the application, a second request for digital content from the domain, and providing, by the application and to the domain at a second time, a vague identifier corresponding to the randomly selected identifier and a randomized cohort age bucket that indicates a range of ages of cookies that contains the age of the randomized cohort, wherein the age of the randomized cohort is calculated based on the difference between the second time and the first time.

In some implementations, the method further includes detecting, by the domain and based on the received randomized cohort age bucket, abnormal activity associated with the randomly selected identifier and at least one of: a number of interactions associated with the randomly selected identifier, a randomized cohort age distribution, and a probability distribution associated with a particular interaction and a particular period of time.

In some implementations, wherein assigning, to the application, a randomized cohort includes assigning, by the domain, the randomized cohort to the application, and wherein the randomly selected identifier is assigned to the at least a threshold number of other applications, wherein the randomly selected identifier is a randomly generated identifier selected from among two or more randomly generated identifiers, and wherein the unique public key is generated by the domain.

In some implementations, assigning, to the browser, a randomized cohort includes assigning, by a central server, the randomized cohort to the application, wherein the randomly selected identifier is assigned to the at least a threshold number of other applications, wherein the randomly selected identifier is a randomly generated identifier selected from among two or more randomly generated identifiers, and wherein the unique public key is generated by the central server.

In some implementations, the method includes providing, by the application, a request for digital content from a second domain different from the first domain and the randomized cohort, in response to providing the request for digital content from the second domain, receiving, by the application and from the second domain, an attestation request that includes a challenge, and providing, by the application and to a verification system, the digitally signed certificate, which triggers the verification system to (i) create a vague certification comprising the randomly selected identifier, the randomized cohort age bucket, and the challenge, (ii) sign the vague certification, and (iii) provide the vague certification to the second domain, wherein the challenge is blinded from the verification system using a blinding scheme.

In some implementations, the method includes providing, by the application and to a verification system, the digitally signed certificate, and verifying, by the verification system, that the randomized cohort is assigned to at least a threshold number of people.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

The ways in which a digital component distribution system selects and distributes personalized digital components (e.g., generate selection parameters and/or the selection parameters themselves) have historically included using user information (e.g., browsing information, interest group information, etc.) obtained from third-party cookies, which are cookies dropped on the client device by a domain (e.g., eTLD+1) that differs from the domain of the web page being rendered on the client device. However, some browsers are blocking the use of third party cookies, making it more difficult to select and provide personalized digital components, meaning that computing resources and bandwidth may be wasted by selected and distributing content to users that is not of interest to the users. Furthermore, features that a computer system could previously perform using the third-party cookies are no longer able to be performed, thereby resulting in a less efficient and less effective computer system. To overcome this problem, privacy preserving techniques that enable the monitoring, aggregation, and analysis of web activity, while impeding the tracking of users, and while preventing the leakage of user information across computing systems can be used. In other words, the techniques discussed herein are changing the way that the computing systems operate to overcome problems that arise when browsers do not support the use of third-party cookies.

The privacy-preserving monitoring mechanism described herein, randomized cohorts, provides web activity monitoring functionality. Randomized cohorts include an identifier and a timestamp. The combination of the identifier and the timestamp cannot uniquely identify a particular browser or user device, and instead. However, the timestamp can be obfuscated while still providing useful information by generating an age bucket to which the randomized cohort belongs and providing the combination of the identifier and the age bucket. The identifier and age bucket combinations are assigned to at least a threshold number of unique browsers running on different user devices, thus guaranteeing anonymity without sacrificing statistical utility of the randomized cohort. Randomized cohorts can be used to generate statistics regarding the activity of the cohort and to other information, while ensuring user anonymity. Users are randomly grouped into cohorts of size k, such that a domain to which the randomized cohort is scoped can track the activity of the cohort but not the activity of any one user.

Additionally, randomized cohorts can be used in a security context for third parties, such as content providers and hosts, to detect fraudulent activity or coordinated misuse. For example, randomized cohorts allow for existing counter-abuse techniques to combat engagement abuse. Engagement abuse can include behavior such as click fraud, view count inflation, rating manipulation, rank manipulation, etc. Randomized cohorts can be used to detect suspicious web activity indicating fraudulent usage while providing users with a specific level of privacy that has not previously been available to users. For example, randomized cohorts can be used to provide users with a k-anonymity guarantee. A guarantee of k-anonymity ensures that there are at least k random users associated with a single randomized cohort, which can be identified by a randomized cohort identifier and a timestamp. For example, a guarantee of k-anonymity for a randomized cohort identifier where k=100 ensures that there are at least 100 random users associated with the randomized cohort identifier, such that information associated with a particular randomized cohort is anonymized to certain extent while remaining useful for applications such as statistical analysis and abuse detection.

The described monitoring mechanism, randomized cohorts, improves user experience and trust by providing privacy guarantees that can be externally verified by independent third parties. The described system can include one or more verification servers that are independent of the sources of the randomized cohorts, such that the randomized cohorts and specific identity of a user remains hidden while allowing the verification server to determine the statistical properties of a particular randomized cohort identifier. This allows users to confirm, through an independent source, that their anonymity is being maintained and that the privacy-preserving system is functioning as promised. Users who can individually substantiate guarantees of privacy may feel more comfortable adopting a system that uses the described monitoring mechanism.

Furthermore, randomized cohorts may be used as a replacement in systems using traditional methods of web activity monitoring. For example, randomized cohorts can be used in existing systems with little adaption required under certain conditions, allowing system designers to re-use existing infrastructures for providing relevant statistical data regarding web activity and performing security functions to protect third parties while improving user privacy.

The techniques discussed throughout this document can also be used to detect irregular activity (e.g., network attacks), and shut down the irregular activity. For example, these techniques can detect a higher than usual level of network requests or traffic, and use that information to prevent further network requests or traffic, or blocking further requests from a group of computing devices that are responsible for the high level of network requests or traffic. The techniques can also be used to detect overuse of specific computing resources, and perform load balancing to improve the efficiency of a computer system.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for guaranteeing a specified level of privacy for users associated with a monitoring mechanism, a randomized cohort, that also provides statistical tracking and abuse detection capabilities.

Figure 1:
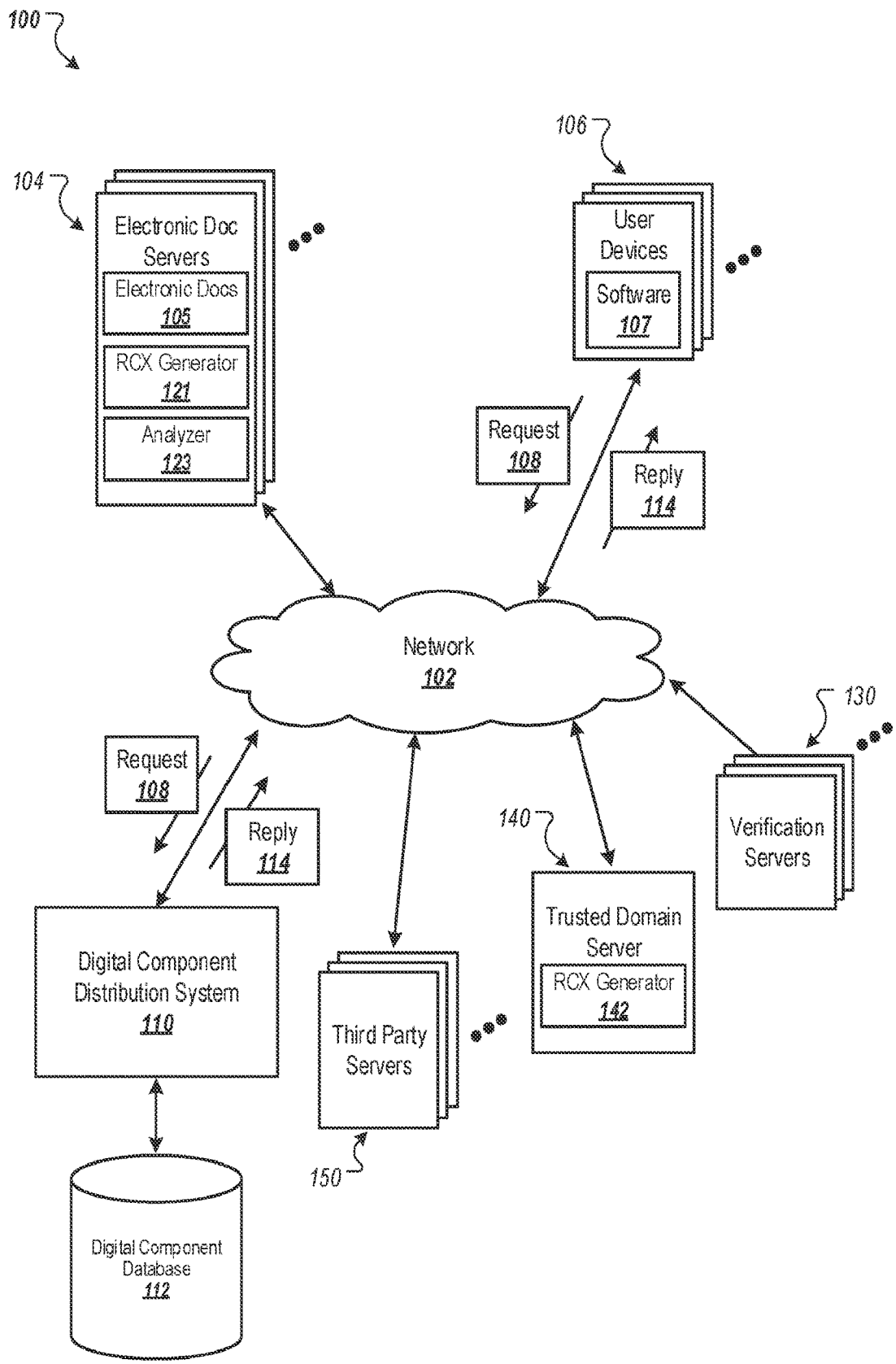
FIG. 1 is a block diagram of a system in which a privacy-preserving monitoring mechanism is implemented.

FIG. 1 is a block diagram of an environment 100 in which for privacy preserving data collection and analysis. The example environment 100 includes a network 102, such as a local area network (LAN), a wide area network (WAN), the Internet, or a combination thereof. The network 102 connects electronic document servers 104 ("electronic doc servers"), user devices 106, a digital component distribution system 110 (also referred to as DCDS 110), one or more verification servers 130. The example environment 100 may include many different electronic document servers 104, user devices 106, verification servers 130, and trusted domain servers 140. For ease of explanation, one trusted domain server 140 is shown.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

User device 106 includes software 107. Software 107 can be, for example, a browser or an operating system. In some implementations, software 107 allows a user to access information through a network, such as network 102, retrieving information from a server and displaying the information on a display of user device 106. In some implementations, software 107 manages user device 106's hardware and software resources and provides common services for other programs on user device 106. Software 107 can act as an intermediary between programs and user device 106's hardware.

Software 107 is specific to each user device 106. As described in detail below, the privacy preserving data analysis and collection innovations provide a device-specific solution that is resource-efficient and secure.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic doc servers 104. For example, the electronic doc servers 104 can include servers that host publisher websites, such as a network domain (e.g., eTLD+1). The electronic doc servers 104 can each be servers within or associated with a separate domain (e.g., a different eTLD+1).

In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items, such as electronic docs or digital components, that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

Data that specifies characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

Further to the privacy preserving techniques discussed throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

The DCDS 110 can forward requests 108 from software 107 of a user device 106 to the sources of the data, such as the electronic doc servers 104 and can forward the replies 114 from the electronic doc servers 104 to the software 107 of the user device 106. For example, the DCDS 110 acts as a middle-man between the electronic doc servers 104 and the user devices 106 and/or the software 107 running on the user devices 106.

Randomized cohort generator 121 (RCX Generator) allows an electronic doc server 104 to generate a randomized cohort, the privacy-preserving monitoring/aggregation mechanism described herein. Within this document, a randomized cohort refers to a specific format of the privacy-preserving monitoring mechanism having a randomized cohort identifier and a randomized cohort timestamp. A randomized cohort is generated in response to an initial third party request from an application such as software 107 or a device such as user device 106, and includes an identifier (i.e., a randomized cohort identifier) and a timestamp (i.e., a randomized cohort timestamp). For example, the randomized cohort can be data represented by rcx (rcx.id, rcx.timestamp), where rcx represents the randomized cohort, rcx.id represents the randomized cohort identifier and rcx.timestamp represents the timestamp. The randomized cohort is assigned to the software 107 or user device 106 from which the initial request was received. For simplicity of explanation, in this example, randomized cohorts are generated in response to an initial request from a browser 107. In other examples, randomized cohorts can be generated in response to an initial request from a particular user device 106.

Because randomized cohort generator 121 is associated with a particular domain, the randomized cohort generated by each generator 121 can be domain-scoped, meaning the randomized cohort data is used within the domain with which the randomized cohort generator 121 and/or the electronic doc server 104 is associated, and that the randomized cohort is not provided to, or shared with, other domains or servers.

The initial request can be a request for an electronic doc 105 from electronic doc server 104. The initial request can be a request for a content item from a third party server 150 that provides content such as digital components that can be provided for display along with content requested from the electronic doc servers 104.

The randomized cohort identifier is a randomly selected or constructed identifier that is also assigned to a number of other browsers 107, executing on other user devices 106, that have also provided initial requests to the electronic doc server 104. For example, the randomized cohort identifier can be a randomly generated 64 bit identifier that is selected from among a set of existing identifiers or created in response to the initial request from the browser 107. The number of other applications 107 to which the randomized cohort identifier is assigned is based on a predetermined threshold level of privacy guaranteed to users. For example, the electronic doc servers 104 can implement a guarantee of k-anonymity, meaning each randomized cohort identifier is assigned to at least k browsers 107 operating on different user devices 106. Each electronic doc server 104 can independently select a k to guarantee. In some examples, each electronic doc server 104 guarantees the same level of k-anonymity.

The randomized cohort timestamp indicates a time at which the randomized cohort identifier is requested and/or assigned to the software 107 in response to the request 108. For example, the randomized cohort timestamp can indicate the time at which the request 108 was received by the randomized cohort generator 121. In another example, the randomized cohort timestamp can indicate the time at which the randomized cohort identifier was selected in response to the request 108. In another example, the randomized cohort timestamp can indicate the time at which the randomized cohort identifier was assigned to software 107 in response to request 108. One or more of these actions can be performed at the same time, and therefore the randomized cohort timestamp can represent the time at which one or more of these actions is performed. Because the randomized cohort identifier is assigned to at least k browsers 107 for the purposes of maintaining k-anonymity (i.e., assigned to 3000 different browsers 107 for k=3000), the combination of the randomized cohort timestamp and the randomized cohort identifier can act as a unique identifier. In order to preserve privacy when providing the randomized cohort, randomized cohort generator 121 can anonymize the randomized cohort timestamp as well, creating a parameter representing an age bucket within which the randomized cohort falls. An age bucket represents a generalized range of age values within which the age of the randomized cohort falls, but cannot be used to uniquely identify the browser 107 to which the randomized cohort was assigned. For example, randomized cohort generator 121 can determine a difference between a current time and the randomized cohort timestamp to determine an age of the randomized cohort. Randomized cohort generator 121 can then generate a value for the age bucket based on, for example, information such as the k value and a range of ages needed to maintain k-anonymity or a predetermined range of ages, among other parameters.

In addition to the randomized cohort, which includes the randomized cohort identifier and the randomized cohort timestamp, randomized cohort generator 121 generates a certificate that can be used to attest to the validity of the randomized cohort. For example, randomized cohort generator 121 can generate a certificate that contains a public verification key that is signed by the electronic doc server 104. The electronic doc server 104 can also generate a public/private key pair. The certificate generation process and verification process is described in further detail below.

The randomized cohort, which includes both of the randomized cohort identifier and the randomized cohort timestamp, is a flexible privacy-preserving monitoring mechanism that allows for anonymity as well as unique identification. As described in further detail below, the certificate can be used to uniquely identify the browser 107 when the browser 107 is attesting to the validity of its randomized cohort. For example, the browser 107 can transmit, for verification purposes, the certificate provided by randomized cohort generator 121 to a verification system.

In some implementations, no metadata other than the randomized cohort is provided by the issuing domain, or electronic doc server 104, to be stored on the user device 106 on which the browser 107 is stored. This additional restriction further improves user privacy by reducing the amount of data that is collected and stored, eliminating the possibility of compromising particular types of user data, which is not collected and therefore cannot be linked to a particular user or randomized cohort identifier.

Analyzer 123 analyzes randomized cohort data to monitor user web activity. Analyzer 123 can receive a randomized cohort identifier and randomized cohort age data with requests for data from the electronic doc server 104 with which analyzer 123 is associated, and use the received randomized cohort identifiers and randomized cohort age data to perform security functions. For example, analyzer 123 can detect, based on randomized cohort identifiers and randomized cohort age data, certain types of fraudulent activity or coordinated abuse of the system or content from electronic doc server 104. As illustrated in FIG. 1, each electronic doc server 104 can have a separate analyzer 123 tailored to its own needs. In some examples, electronic doc servers 104 can share a centralized analyzer 123, which can be implemented as a remote or separate analysis server or service.

System 100 includes one or more third party independent verification services that a user of a user device 106 or browser 107 can choose to use. The third party independent verification services independently verify privacy properties of randomized cohorts assigned by the issuing services, such as the electronic doc servers 104 as described above and the trusted domain server 140 as described below. The independent verification of the privacy properties of the randomized cohorts is optional for the user and is described in further detail below.

Verification server 130 is a server, independent of the electronic doc servers 104, that performs verification of the statistical properties of randomized cohort identifiers and pairs of randomized cohort identifiers and randomized cohort age parameters. Verification server 130 acts as an independent server that does not issue randomized cohorts and does not participate in monitoring randomized cohort data or otherwise interacting with servers, such as electronic doc servers 104, that monitor and/or analyze randomized cohort data. Verification server 130 allows users to verify that issuing servers, such as electronic doc servers 104, are maintaining the guaranteed level of privacy for the particular randomized cohort. By giving users a chance to verify, through an independent service, that their privacy is being maintained by participating issuing domains, the system 100 encourages user trust and improves user experience. Additionally, this allows users to discern whether a particular issuing domain is in compliance and hold issuing domains accountable, thus improving the experience for all users.

Trusted domain server 140 is a server, independent of the electronic doc servers 104, that can issue a randomized cohort to software 107 in response to a request 108. Trusted domain server 140 issues randomized cohorts that are globally-scoped, meaning the randomized cohorts can be provided to requesting servers from different domains, and is not limited to use within a particular domain like the domain-scoped randomized cohorts generated by the electronic doc servers 104. Trusted domain server 140 acts as a central source of randomized cohorts, guaranteeing one or more levels of privacy for each randomized cohort generated and assigned. In some implementations, trusted domain server 140 is separate from the electronic doc servers 104, does not share information with any of the electronic doc servers 104, and does not provide or host content. For example, trusted domain server 140 does not participate in the content distribution process, and is involved in the system 100 only to generate and assign randomized cohorts to maintain the privacy of users of system 100.

Randomized cohort generator 142 (RCX Generator) is a generator that operates similarly to the randomized cohort generator 121 as described above, but is associated with the trusted domain server 140 instead of an electronic doc server.

Figure 2:
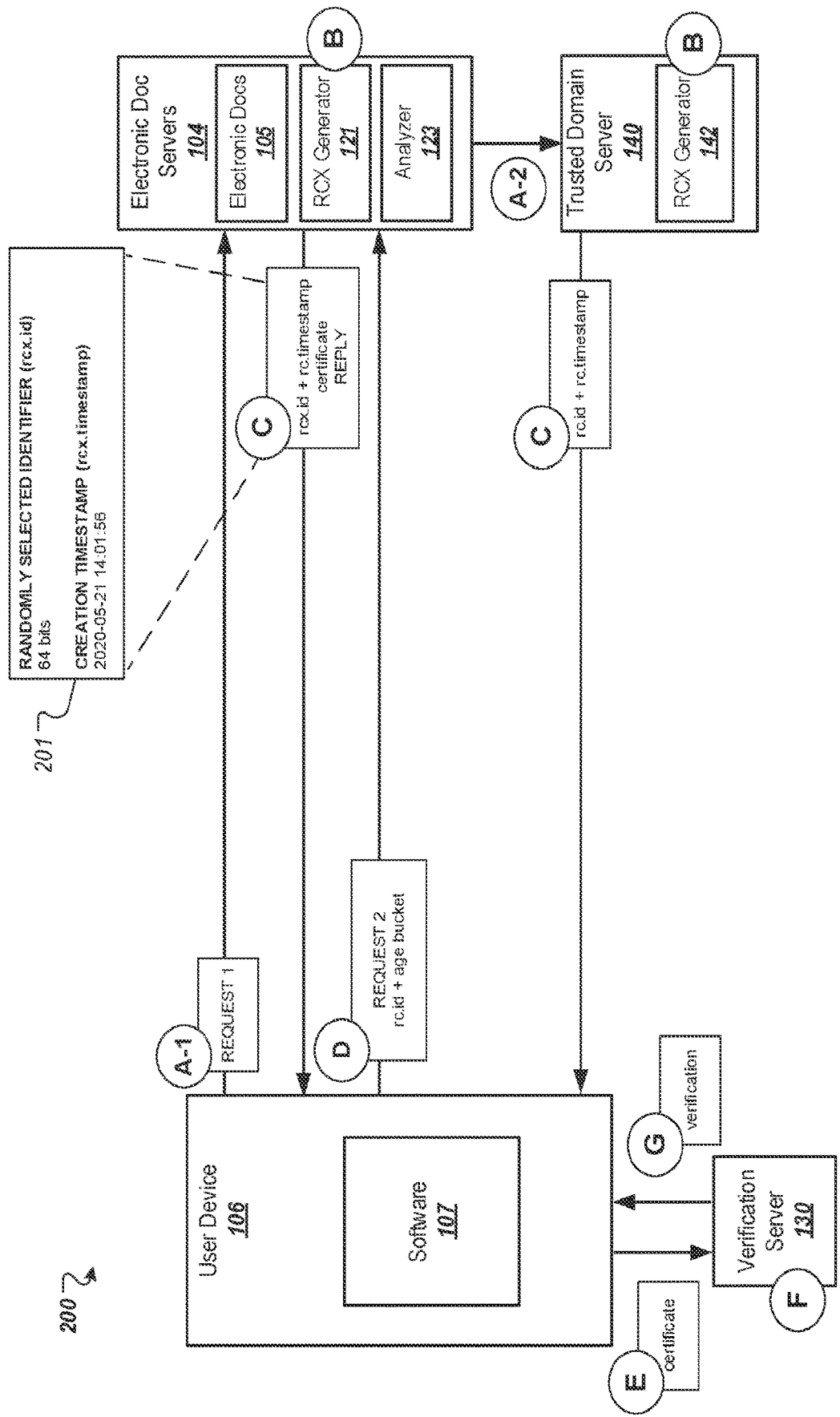
FIG. 2 is a data flow diagram of an example process for issuing and implementing a privacy-preserving monitoring mechanism.

FIG. 2 is a data flow diagram of an example process 200 for issuing and implementing a privacy-preserving monitoring mechanism. As described below, domains supporting randomized cohorts are required to assign randomized cohorts to users in a way that preserves certain verifiable k-anonymity properties. Operations of the process 200 can be implemented, for example, by electronic doc servers 104, user devices 106, verification server 130, trusted domain server 140, and/or third party servers 150. Operations of the process 200 can also be implemented as instructions stored on one or more computer readable media which may be non-transitory, and execution of the instructions by one or more data processing apparatus can cause the one or more data processing apparatus to perform the operations of the process 200.

As discussed above with respect to FIG. 1, the DCDS 110 may act as an intermediary, forwarding requests 108 from user devices 106 to electronic doc servers 104 and forwarding replies 114 from electronic doc servers 104 to user devices 106. In this particular example, the DCDS 110 may transmit data between user devices 106 and electronic doc servers 104, but is not illustrated in the data flow.

The process 200 begins with stage A-1, in which user device 106 provides a request to electronic doc servers 104 for content. For example, software 107 provides a request to an electronic doc server 104, associated with a specific network domain, for content such as a particular web page. Software 107 can provide a request for third party content, such as digital component, in addition to the web page. For example, software 107 can provide a request to third party servers 140. The request in stage A-1 can be the request from the user device 106 that is either a request for the content or a digital component. The request can be provided to an electronic doc server 104 or to a third party server 140. In this particular example, the request, labelled request 1, is provided to an electronic doc server 104.

Request 1 is an initial request from software 107. An initial request indicates that software 107 has not previously issued a request to electronic doc server 104, that software 107 has not previously been issued a randomized cohort, and/or that a previously issued randomized cohort has expired, been reset by the user associated with the software 107, or is otherwise invalid. For example, request 1 can indicate that software 107 has not previously issued a request to electronic doc server 104, and thus that electronic doc server 104 should issue and assign a randomized cohort to software 107. In some implementations, if system 100 uses a single, central issuing entity such as trusted domain server 140, stage A-2 occurs, in which data indicating request 1 is forwarded from electronic doc servers 104 to trusted domain server 140. If system 100 uses separate issuing entities, such as electronic doc server 104, stage A-2 does not occur. In this particular example, stage A-2 does not occur because system 100 uses separate issuing entities. In other examples and implementations, stage A-2 can occur even if system 100 uses separate issuing entities.

The process 200 continues in stage B, in which a randomized cohort generator generates/constructs a randomized cohort 201 in response to receiving data indicating request 1 and assigns the randomized cohort to the requesting user device 106 or software 107.

If system 100 uses a single, central issuing entity such as trusted domain server 140, randomized cohort generator 142 performs stage B by generating a randomized cohort in response to receiving data indicating request 1. If system 100 uses separate issuing entities, such as electronic doc server 104, randomized cohort generator 121 performs stage B by generating a randomized cohort in response to receiving data indicating request 1. In this particular example, stage B is described as being performed by randomized cohort generator 121. In other examples and implementations, stage B can be performed by randomized cohort generator 142 if, for example, system 100 uses a single, central issuing entity such as trusted domain server 140.

Randomized cohort generator 121 generates each randomized cohort based on a randomly selected identifier and a timestamp. An identifier can be randomly generated or, when system 100 has a sufficient volume of different browsers 107 running on different user devices 106 or different user devices 106, an identifier can be selected from among existing identifiers that are already in use. In this particular example, the randomized cohort generator 121 selects a 64-bit identifier as the randomized cohort identifier.

The concept of k-anonymity as applied to randomized cohort identifiers guarantees that each randomized cohort identifier is assigned to at least k browsers 107. For example, the k different browsers 107 can be used as a proxy metric to guarantee k different user devices 106 corresponding to k different users. Each of the issuing domains guarantees a particular k for the randomized cohorts that it issues, such that each of the randomized cohort identifiers is assigned to at least k browsers 107 running on different user devices 106. In order to guarantee such levels of privacy, the issuing domains must track the number of each randomized cohort identifier that is issued and associate browsers 107 with particular randomized cohort identifiers that have already been assigned. During the assignment process browsers 107 can be assigned to clusters of browsers 107 assigned to a particular randomized cohort identifier. For example, randomized cohort generator 121 can randomly assign browser 107, from which request 1 was received, to a cluster of browsers 107 that are associated with a particular randomized cohort identifier.

Each issuing domain performs the assignment process to provide a uniformly distributed (or within a threshold of uniformly distributed) assignment of identifiers. For example, randomized cohort generator 121 can randomly assign browser 107 to one of a set of randomized cohort identifiers that have already been generated and associated with browsers 107. Randomized cohort generator 121 balances the number of different randomized cohort identifiers with the number of browsers in order to maintain its k-anonymity guarantee to users. For example, randomized cohort generator 121 can balance the number of different randomized cohort identifiers being assigned based on the number of expected and current browsers 107 providing requests for content to the respective electronic doc servers 104. In one example, randomized cohort generator 121 can generate or receive a threshold number of different randomized cohort identifiers based on expected browsers 107 providing requests for content to the electronic doc server 104 and can adjust the threshold number of different randomized cohort identifiers based on an actual, current amount of traffic from different browsers 107 providing requests for content to the electronic doc server 104. For example, randomized cohort generator 121 can increase the number of different randomized cohort identifiers associated with its domain based on an increase in the number or a velocity of change in the number of different browsers 107. In another example, in an initialization of the system 100, the randomized cohort generator 121 can receive a number of requests from different browsers 107 running on separate user devices 106 and randomly assign a cluster of k browsers 107 to a particular randomized cohort identifier to guarantee k-anonymity.

In order to guarantee k-anonymity, a domain must have a sufficient volume of traffic for statistical arguments to become meaningful and provide an anonymizing effect such that a particular randomized cohort identifier is assigned to a number k of different browsers running on different user devices. System 100 can ensure that the system has sufficient volume of traffic by setting and adjusting thresholds for web activity levels and to ensure that a domain sustains a sufficient amount of traffic for randomized cohort privacy properties to become verifiable.

Once a randomized cohort is generated and assigned to a browser 107, the randomized cohort can have an expiration time. For example, the randomized cohort can expire after a predetermined period of time or until a user resets, or clears, the randomized cohort. In some examples, the randomized cohort can expire after a period of time specified by a user of browser 107, a default setting of browser 107, the issuing domain, a period of time determined by browser 107 based on the web activity of the user of browser 107 and the habits of the user or users having similar browsing habits as the user. For example, if users often clear randomized cohorts associated with an issuing domain on a regular schedule, the expiration period of a randomized cohort can be adjusted such that the randomized cohort is cleared on a regular schedule similar to the one that users of the domain generally use.

Randomized cohort generator 121 can reassign previously-used randomized cohort identifiers when a randomized cohort identifier assignment expires or is cleared. For example, randomized cohort generator 121 can randomly assign a randomized cohort identifier to a browser 107 using a list of available randomized cohort identifiers, including previously expired randomized cohort identifiers, or randomly generate a randomized cohort identifier based on the needs of the system.

In some implementations, randomized cohort identifiers can get "stale;" in other words, the number of users assigned to a particular randomized cohort identifier may degrade over time as users reset their randomized cohorts or their randomized cohorts expire. While an issuing domain, such as electronic doc server 104, can guarantee k users at the time that the randomized cohorts are issued, the number of users behind an FC may decrease as randomized cohorts expire or are reset. The system 100 can counteract this reduction in users per bucket by, for example, storing one or more additional states on the server that indicate a recycling status for randomized cohort identifier/age buckets for which there are less than k users. Additionally, verification servers 130 can also detect a lack of activity in a particular bucket of users (i.e., a bucket of users assigned to a particular randomized cohort identifier within a period of time). Verification servers 130 can also provide feedback to browsers 107 regarding the distribution of randomized cohort identifiers and can provide feedback to randomized cohort generator 121.

In addition, the randomized cohort generator 121 generates a timestamp that indicates the time at which the randomized cohort identifier was assigned or generated as described above with respect to FIG. 1. For example, at the time that the request from software 107 is received, the randomized cohort generator generates a randomized cohort timestamp. The timestamp indicates when the randomly selected identifier was assigned to a issuing domain that assigns randomized cohorts to users randomly.

Users of browsers 107 can reset the randomized cohort associated with their browser 107 at any time just as other monitoring mechanisms can be clear and/or reset. When a user resets the randomized cohort issued by an issuing domain associated with their browser 107, the next request that is sent from the browser 107 to the issuing domain, such as an electronic doc server 104 is received as an initial request for which a randomized cohort is to be assigned to the browser 104.

In addition to the randomized cohort assigned to browser 107, randomized cohort generator 121 generates a certificate that contains the randomized cohort and a public/private key pair. This certificate, provided by randomized cohort generator 121, contains identifiable information of browser 107, including the randomized cohort identifier and the randomized cohort timestamp. Randomized cohort generator 121 signs the certificate, which indicates the authenticity of the certificate and its assignment to browser 107. The signed certificate is used only for verification purposes, as described in further detail below, and is never transmitted to or accessible by domains other than a verification server. Randomized cohort generator 121 generates a public key, which may be known to others, and a private key, which may never be known by anyone except the browser 107, using cryptographic algorithms. The public/private key pair is used for attestation, or proving the identity of the browser 107 providing the signed certificate that includes the randomized cohort. In particular, the public key is provided to a requesting entity and browser 107 can use the private key to cryptographically prove that it was assigned the certificate. In addition, the certificate can be encrypted using the public/private key pair.

The verification server 130 verifies that the signature on the certificate is valid. For example, if examplecoolvideoplatform.com issued the certificate, then the verification server 130 would retrieve examplecoolvideoplatform.com's public keys and verify that the signature on the certificate is valid. The keys can, for example, be distributed through techniques such as public key infrastructure (PKI), and do not need to be distributed by the electronic doc server 104 associated with the randomized cohort generator 121 that generated the certificate. The verification server 130 then generates a challenge and transmits the challenge to the browser 107. For example, the challenge can be a random number or some variable known to the verification server 130. The browser 107 can then sign the challenge using its private key and return the signature to the verification server 130. The verification server 130 is then able to verify that the signature is valid using the public verification key published on the signed certificate.

The process 200 continues with stage C, in which electronic doc server 104 provides the randomized cohort, the signed certificate, the public/private key pair, and the response to the request to the browser 107. In some implementations, electronic doc server 104 provides each of the randomized cohort, the signed certificate, the public/private key pair, and the response to the request at the same time to the browser 107. In other implementations, electronic doc server 104 provides one or more of the randomized cohort, the signed certificate, the public/private key pair, and the response to the request separately to the browser 107. In some implementations, the private/public key pair is distributed through standard techniques such as PKI. As described above, particular stages of process 200 that are performed by electronic doc server 104. For example, stage C can be performed by trusted domain server 140.

The process 200 continues with stage D, in which browser 107 provides a subsequent request to electronic doc server 104, along with randomized cohort data. The subsequent request can be identical in format to the initial request, and is not required to provide any additional information indicating that the request is subsequent to the initial request. Browser 107 detects that the request is being provided to a domain associated with a randomized cohort that browser 107 has been assigned and provides randomized cohort data, thus indicating to electronic doc server 104 that the request is a subsequent request. The randomized cohort data allows the domain associated with electronic doc server 104 to monitor the activity of different browsers within the domain while preserving the privacy of the users of the browsers to a greater extent than was previously possible.

Browser 107 provides randomized cohort data including its assigned randomized cohort identifier for the domain associated with electronic doc server 104 and data representing an obscured age of the randomized cohort for the domain. Specifically, browser 107 generates a randomized cohort age bucket to be provided instead of the randomized cohort timestamp to obscure the specific identity of the browser 107. For example, browser 107 uses a function RCX.AgeBucketFn( ) to compute a randomized cohort age bucket. The function can be, for example, a bucketing function such as log 2(currentTime−randomized cohort. Timestamp), where currentTime represents the current time and randomized cohort. Timestamp represents the randomized cohort timestamp.

Because browser 107 provides both of the randomized cohort identifier and the randomized cohort timestamp with subsequent requests, the issuing domain (in this example, electronic doc server 104 of the issuing domain) is responsible for guaranteeing that there are at least k users, or user proxies of browsers 107, assigned to each pair of randomized cohort identifier and randomized cohort age bucket in order to satisfy its k-anonymity guarantee. In some implementations, the issuing domain can guarantee different levels of k-anonymity with respect to the randomized cohort identifier and the randomized cohort identifier and randomized cohort timestamp pair.

Optionally, users of browser 107 can choose to verify the statistical and/or privacy properties of the randomized cohort assigned to browser 107. Any third party that is not the issuing domain of the randomized cohort to be verified (such as electronic doc server 104 or trusted domain server 140) can maintain a verification server 130, and users can choose to direct their browsers 107 to any verification server 130. In some implementations, electronic doc servers 104 can maintain a verification server 130 to verify the statistical and/or privacy properties of randomized cohorts that are issued by other electronic doc servers 104 associated with other domains. In some implementations, browsers 107 can automatically request verification from verification servers 130 without being instructed by a user. For example, system 100 can require participating browsers 107 to periodically request verification from a randomly selected eligible verification server 130. In some implementations, browsers 107 do not request verification unless instructed by a user.

The process 200 continues with stage E, in which software 107 provides the certificate to verification server 130. For example, browser 107 provides the certificate generated by randomized cohort generator 121 in stage B to verification server 130. Browser 107 can also provide the public key to the verification server for attestation purposes. In some implementations, browser 107 provides randomized cohort information, such as the randomized cohort identifier and the randomized cohort age bucket, instead of the certificate, which does not obscure the randomized cohort age.

The process 200 continues with stage F, in which the verification server 130 performs the verification process of verifying the statistical and/or privacy properties of the randomized cohort data provided by browser 107.

The verification server 130 verifies that the set of randomized cohort identifiers to which the verification server 130 has access are uniformly distributed. For example, verification server 130 can use the certificate to determine a randomized cohort identifier and/or a randomized cohort age bucket. Verification server 130 can then compare the randomized cohort identifier and/or the randomized cohort age bucket to a list of randomized cohort identifiers and/or randomized cohort age buckets to which verification server has access to determine whether the number of browsers operating on different user devices assigned to each different randomized cohort identifier within an appropriate scope is uniformly distributed or within a threshold distance to being uniformly distributed. As discussed above, the scope can be within a particular domain or globally within the network of participating domains. For example, verification server 130 can maintain a list of randomized cohort identifier and randomized cohort age bucket pairs that it has received from browsers 107 participating in its verification service. Verification server 130 can then determine whether the number of different browsers operating on different user devices assigned to each different randomized cohort identifier within a particular age bucket and/or domain is normally distributed. In some implementations, verification server 130 determines whether the number of different browsers operating on different user devices assigned to each different randomized cohort identifier within a particular domain is normally distributed without the additional requirement of being within the same age bucket.

Browser 107 can automatically request verification from a verification service such as verification server 130 at a particular time interval. For example, browser 107 can request verification from verification server 130 on a weekly basis to ensure that electronic doc server 104 is in compliance with its k-anonymity guarantee responsibilities, and is delivering the level of privacy that it promises to users.

Optionally, during a content delivery process in which randomized cohorts are globally-scoped and are not assigned by each domain, an electronic doc server 104 from which browser 107 requests content can include an attestation request in its response to the initial request from browser 107.

Such a randomized cohort would be provided by browser 107 to each electronic doc server 104 on each request, regardless of the domain with which the electronic doc server 104 is associated. Using globally-scoped randomized cohorts prevents malicious domains from colluding to combine randomized cohorts across domains in a way that creates more trackable entropy, reducing the risk of compromising user privacy due to collusion between domains. However, globally-scoped randomized cohorts are globally readable, which does not eliminate the possibility of abuse due to tactics such as replay attacks. For example, a malicious actor can purchase traffic to a domain, harvest randomized cohorts (including randomized cohort identifiers and randomized cohort timestamps) and then use the observed distributions to attack a different domain. Because the entity that produced the randomized cohorts is separate and independent different from the servers from which content is requested, such as electronic doc servers 104 or third party servers 150, the server from which content is requested would need to be able to perform an attestation step to verify that the browser 107 providing the randomized cohort identifier and randomized cohort timestamp has actually been assigned a randomized cohort from a trusted server such as trusted domain server 140.

The attestation request can specify browser 107 should request for a verification server 130 to determine whether the randomized cohort identifier and randomized cohort age bucket provided to the electronic doc server 104 with a request for content by browser 107 was actually assigned to browser 107 by a trusted server, such as trusted domain server 140. For example, electronic doc server 104 can request that verification server 130 require browser 107 to attest to its identity as the browser 107 to which the certificate and associated randomized cohort information was assigned by a trusted server, such as trusted domain server 140. Verification server 130 can facilitate this attestation process by generating an anonymized certificate, different from the certificate provided and signed by randomized cohort generator 121, that attests that a particular certificate was assigned to a particular browser 107. This process is not relevant where the randomized cohorts are locally-scoped to each domain such that each domain issues a randomized cohort to the browser 104, and therefore would be able to determine whether browser 107 is the browser to which it assigned a randomized cohort based on the signed certificate issued by randomized cohort generator 121. For example, if the randomized cohort generator 121 associated with electronic doc server 104 generated the randomized cohort, it would be able to verify its own signature on a certificate that it receives associated with the randomized cohort or through the use of public key encryption using the public/private key pair generated as described above with respect to stage B.

In one illustrative example, a user accesses ExampleNewsWebsite.com using browser 107. The user reads an article that links to a particular video on ExampleVideoHostingPlatform.com. In this example, browser 107 has previously been assigned a randomized cohort and certificate from trusted domain server 140, and so browser 107 sends a request for the particular video to ExampleVideoHostingPlatform.com, which is associated with electronic doc server 104. In the request, browser 107 includes its assigned randomized cohort identifier and randomized cohort age bucket.

Because the globally-scoped randomized cohort assigned to browser 107 by a trusted server was not generated by randomized cohort generator 121 associated with electronic doc server 104, ExampleVideoHostingPlatform.com may request that browser 107 attest to its identity and forward this request to verification server 130 to complete. Electronic doc server 104 provides browser 107 with a secret X. The secret can have any value, and can be, for example, a randomly generated 16 bit value. Browser 107 provides the secret X and the certificate provided by randomized cohort generator 142 to verification server 130 to request that verification server 130 perform the attestation process. Browser 107 can blind the value of X from verification server 130 to prevent the secret X from being linked to browser 107. For example, browser 107 can use a partially blind signature scheme to blind X from verification server 130. Verification server 130 then receives browser 107's certificate and the blinded secret X and generates an anonymized certificate that indicates the randomized cohort identifier and a randomized cohort age bucket based on the certificate. Verification server 130 then signs this anonymized certificate and returns the signed, anonymized certificate and X to electronic doc server 104 that issued the attestation request. Electronic doc server 104 can compare the randomized cohort information in the signed, anonymized certificate from the verification server 130 to the randomized cohort identifier and randomized cohort age bucket that electronic doc server 104 received from browser 107. If the information matches, browser 107 has successfully attested to its identity has the browser to which trusted domain server 140 assigned the randomized cohort information that was provided to electronic doc server 104.

In some implementations, a more robust verification process can be performed if multiple verification servers 130 collaborate and/or share resources. For example, verification servers 130 can determine whether a number of randomized cohort identifiers within a particular age bucket is in compliance with a k-anonymity guarantee provided by the electronic doc server 104, specified by system 100 in order to be considered in compliance, etc. in the context of a larger population that better represents the total population of participating browsers and domains. Verification servers 130 can use, for example, the total number of unique public keys provided with certificates received across every verification servers can be computed, allowing a user to verify that there are approximately at least k users that have the same randomized cohort identifier.

In another example implementation, electronic doc server 104 can return a unique tracking URL to browser 107 instead of a secret X. Browser 107 can then follow the unique tracking URL and post the signed anonymized certificate from the verification server 130 to the destination at the unique tracking URL.

The independent verification servers 130 can collaborate to show that certain statistical properties of an entire population of randomized cohorts are satisfied and that privacy guarantees are being upheld at scale. Due to the nature and scale of the number of browsers running on different user devices representing different users, the verification servers 130 provide a level of protection in the form of check points that are difficult to spoof, and not formal proofs of correctness or legitimacy.

In some examples, a malicious issuer can use a subset of bits of the randomized cohort identifier to encode sensitive data about a user or otherwise embed information in a hidden way. System 100 can perform uniformity checks at the bit level to inspect the randomized cohort identifiers and determine whether the randomized cohort identifiers are uniformly selected and distributed. For example, verification server 130 can randomly generate a mask, perform a bitwise AND operation with all randomized cohort identifiers and re-aggregate. If randomized cohort identifiers have been uniformly selected and assigned, the result should also be uniform for every mask. In some implementations, verification server 130 remembers randomized cohort identifiers that have been previously assigned for each user and test for bit-level correlations over time. In some implementations, verification server 130 performs tests to ensure that two or more browsers 107 running on different user devices 106 are not consistently assigned to the same randomized cohort identifier.

The process 200 continues with stage G, in which verification server 130 provides the results of the verification process to browser 107. Verification server 130 can provide the statistical and/or privacy properties of the randomized cohort identifier and randomized cohort age bucket to browser 107 in terms of unprocessed numbers. For example, verification server 130 can provide the distribution of randomized cohort identifier assignments or the number of different randomized cohort browsers running on different user devices to browser 107 associated with the randomized cohort identifier. Browser 107 can then compare the unprocessed numbers distribution of randomized cohort identifier assignments to a threshold deviation from a uniform distribution or the number of different randomized cohort browsers running on different user devices to browser 107 associated with the randomized cohort identifier to a threshold number k of different browsers running on different user devices that should be associated with the randomized cohort identifier in order to guarantee k-anonymity. Browser 107 can provide an indication to a user of browser 107 when one or more thresholds have not been satisfied. For example, if the number of different randomized cohort browsers running on different user devices to browser 107 associated with the randomized cohort identifier did not meet the threshold number k of different browsers running on different user devices, browser 107 can display a visual message, play audio, create a vibration, etc. to indicate to the user that the threshold was not met.

In addition to the advantages of providing a monitoring mechanism that provides an independently verifiable level of privacy for users, the randomized cohort provides protections for content providers and hosts of the system. One vector of abuse in content distribution systems is through manipulation of engagement statistics. For example, in schemes in which a content provider pays per interaction (e.g., a pay-per-click system) a user can be incentivized to click on a particular content item to increase the payment required from the content provider. Additionally, on video content platforms, users may collude to coordinate the manipulation of a video content recommendation system by artificially boosting the popularity of certain videos by providing fraudulent views. The randomized cohort provides a monitoring mechanism that allows for the detection of such abuse.

From a user perspective, the randomized cohorts function similarly to traditional monitoring mechanisms while providing a higher level of privacy. Thus, the described system for privacy-preserving monitoring mechanism requires few to no changes to a user's experience while improving their privacy and reducing the probability that a user's information is compromised.

The randomized cohorts rely on the use of statistical arguments for guaranteeing user privacy, and exploit the use of much larger amounts of entropy for purposes of performing abuse detection without violating user privacy. For k=1 in the k-anonymity context, randomized cohorts provide the same level of abuse detection as traditional tracking mechanisms such as cookies. As k increases, randomized cohorts provide users with increasing levels of privacy while remaining useful for abuse detection. Additionally, randomized cohorts do not require trust to be asserted in a first-party context, in which the randomized cohorts are locally-scoped and limited to use by the domain that issued the randomized cohort.

Once browser 107 has provided randomized cohort information to the electronic doc server 104, the electronic doc server 104 can perform security functions such as statistical analysis to detect abuse of the system 100. For example, when the randomized cohorts are locally-scoped to a particular domain and when the randomized cohorts are globally-scoped, each analyzer 123 of a particular electronic doc server 104 can perform statistical analysis as specified by the electronic doc server 104 with which the analyzer 123 is associated.

An electronic doc server 104 can protect its domain against engagement abuse in a way that preserves user privacy through the use of the described monitoring mechanism, randomized cohorts. Because the system guarantees k-anonymity where k is adjustable, the use of randomized cohorts provides a system that offers a continuum of protection from engagement abuse that maintains a level of privacy protection higher than is current possible.

Analyzer 123 of electronic doc server 104 monitors anonymized user web activity through the use of the randomized cohort information and detects signs of engagement abuse or collusion based on statistical properties of the distribution of randomized cohort identifiers and the activity associated with the randomized cohort identifiers. For example, analyzer 123 can detect statistical outlier behavior, such as irregular resource requests or unusual activity from a group of users associated with a particular randomized cohort identifier and/or age bucket.

For a given participating domain, the number of clicks per randomized cohort identifier should be uniformly distributed. A lack of uniformity in the number of clicks can indicate unusual activity. For example, a deviation greater than a threshold deviation from the number of clicks associated with a randomized cohort identifier, or a spike of activity over a period of time (the amount or velocity of deviation) associated with one or more randomized cohorts can indicate statistically unusual activity that can indicate abuse. Analyzer 123 can determine, for example, statistical tests to verify the statistically anomalous activity through metrics such as risk ratios for the activity and its effect on domain resources as compared to the risk and potential damage caused by malicious activity.

Analyzer 123 can compute age distributions for the randomized cohort age buckets received in combination with the randomized cohort identifiers and test for anomalies against, for example, a known global background distribution. For example, analyzer 123 can detect that an amount of activity from browsers with randomized cohort age bucket values below a threshold age value is at or below a threshold amount and determine that there is an unusual amount of activity.

Analyzer 123 can detect coordinated attacks involving cohorts of malicious users by performing fraud detection using algorithms that are camouflage-resistant, provides an upper bound on the effectiveness of fraud using provable limits on undetectable fraud. For example, analyzer 123 can bound the probability that two or more randomized cohort identifier/randomized cohort age bucket pairs visit the same set of long tail websites over some time window. In another example, analyzer 123 can construct a bipartite graph between users and websites and then attempting to find bicliques (a particular kind of bipartite graph where every vertex of the first set is connected to every vertex of the second set) corresponding to clusters of users acting in a coordinated way.

Analyzer 123 can detect fraudulently created entropy for the purposes of tracking one or more users. For example, a malicious actor can attempt to assign a single browser 107 to a randomized cohort identifier where the other k–1 browsers 107 are bots. However, the electronic doc server 104 assigns randomized cohort identifiers to users in a random way, and therefore attacks of this nature this attack would be difficult to pull off without an attacker obtaining server access. A malicious, or compromised domain electronic doc server 104 may be able to perpetrate this fraud on a number of users associated with browsers 107, but it would be difficult for a malicious domain to execute an attack of any meaningful scale while evading detection by an independent verification server such as verification server 130. In addition to providing notice of such randomized cohort identifier/age bucket pairs to electronic doc servers 104 for participating domains so that the domains can prevent abuse from the identified randomized cohort identifiers, such scaled attacks can be effectively deterred by allowing verification servers 130 to perform abuse detection and prevention, allowing verification servers 130 to detect and block or remove randomized cohorts assigned to botnets for a period of time).

When analyzer 123 detects statistically unusual behavior, analyzer 123 can set or adjust restrictions to prevent particular users from requesting resources from a particular electronic doc server 104 or generally from requesting resources for a period of time. For example, analyzer 123 can detect that a particular randomized cohort identifier/randomized cohort age bucket pair is being provided to the electronic doc server 104 and is associated with an unusual amount of activity within the past five minutes and prevent the particular randomized cohort identifier/randomized cohort age bucket from requesting resources from electronic doc server 104. Thus, system 100 can reduce the amount of resources used in furtherance of fraudulent activity. However, when the randomized cohorts are independent, domain-scoped randomized cohorts, each verification server 130 has access to only the randomized cohort identifiers and randomized cohort age buckets of users who have chosen to use that particular verification server 130 as their independent verification service. In some implementations, regardless of whether the randomized cohort is domain or globally-scoped, the verification servers 130 are federated and grouped with other verification servers 130 in order to have access to a threshold amount of randomized cohorts in order to provide browsers 107 with statistically meaningful results.

When the randomized cohort is globally-scoped, analyzer 123 can communicate with trusted domain server 140 to identify suspected fraudulent or unusual activity associated with the globally-scoped randomized cohort identifier/randomized cohort age bucket pair, which can be communicated to other electronic doc servers 104 to monitor for and prevent abuse across participating domains.

Figure 3A:
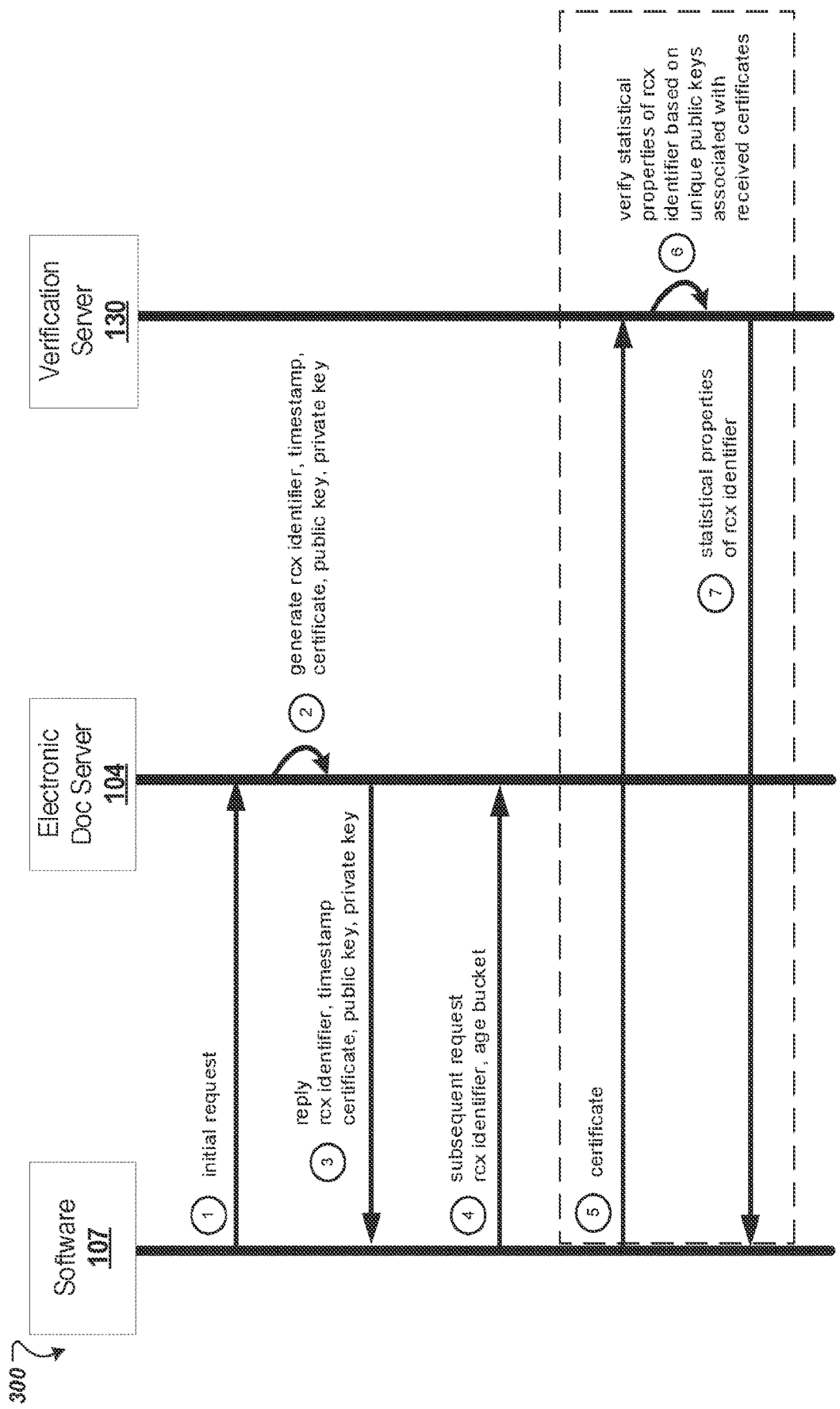
FIG. 3A is a swim lane diagram that illustrates an example process for issuing and implementing a privacy-preserving monitoring mechanism that is limited in scope to a single issuing domain.
Figure 3B:
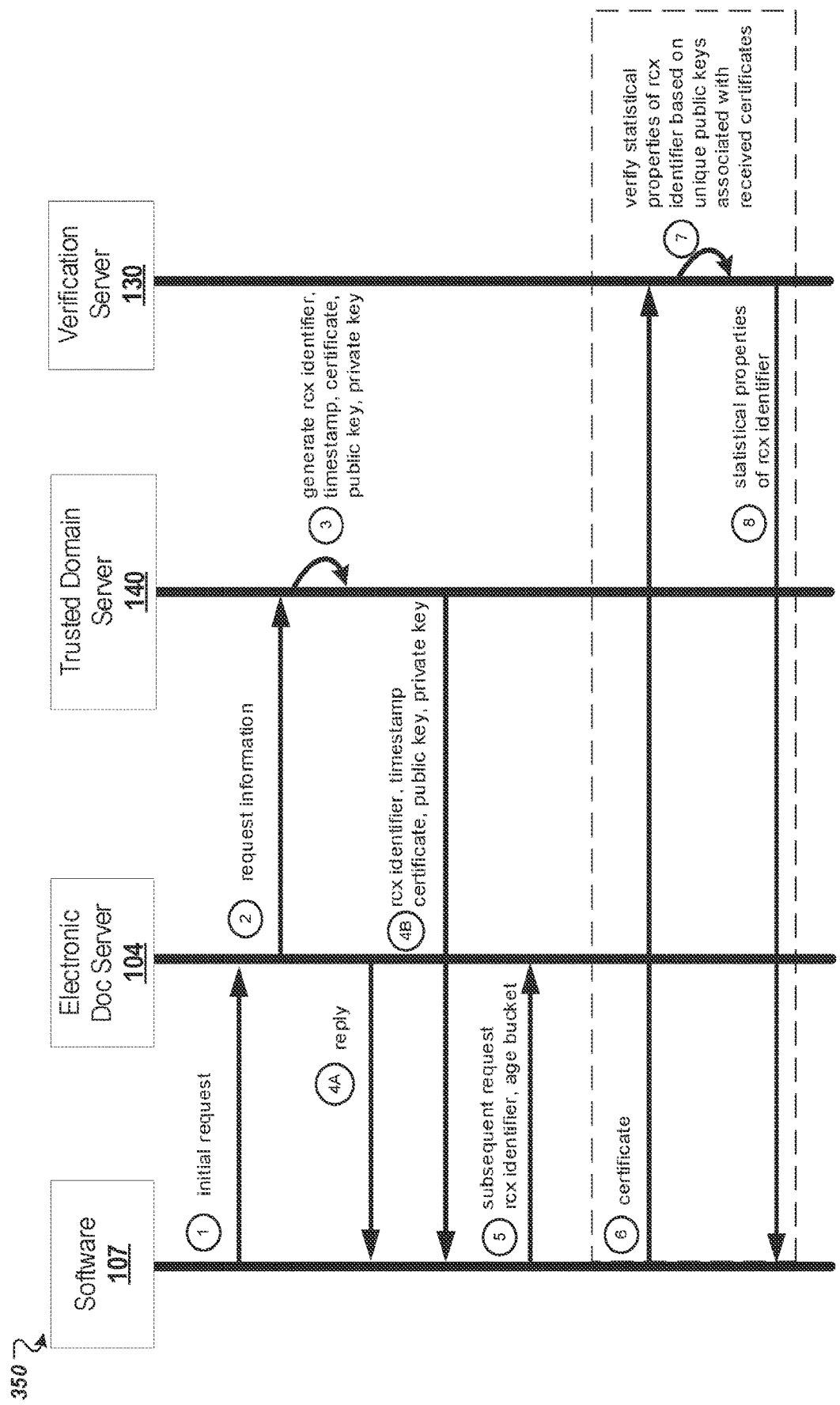
FIG. 3B is a swim lane diagram that illustrates an example process for issuing and implementing a privacy-preserving monitoring mechanism that is used across web activity performed across different domains.

FIGS. 3A and 3B are swim lane diagrams that illustrate example processes 300 and 350 for issuing and implementing a privacy-preserving monitoring mechanism that is used across web activity performed across different domains. Operations of the processes 300 and 350 can be implemented, for example, by user device 106 and/or software 107, electronic doc servers 104, DCDS 110, verification server 130, trusted domain server 140, and/or third party server 150. Operations of the processes 300 and 350 can also be implemented as instructions stored on one or more computer readable media which may be non-transitory, and execution of the instructions by one or more data processing apparatus can cause the one or more data processing apparatus to perform the operations of the processes 300 and 350.

Referring now to FIG. 3A, process 300 begins with step 1, in which an initial request from software 107 is provided to electronic doc server 104. In some examples, this request can be forwarded to electronic doc server 104 through DCDS 110, which is not illustrated in FIG. 3A. For example, ExampleImageHostingPlatform.com, associated with the ExampleImageHostingPlatform network domain, can receive a request from browser 107 for an image. In this example, browser 107 has not been assigned a randomized cohort from ExampleImageHostingPlatform's electronic doc server 104, and therefore the request is an initial request. In another example, if browser 107 was previously assigned a randomized cohort from ExampleImageHostingPlatform's electronic doc server 104 but the randomized cohort has expired or been cleared by a user of browser 107, the request is also considered an initial request.

Process 300 continues with step 2, in which electronic doc server 104, generates a randomized cohort, including a randomized cohort identifier, a randomized cohort timestamp, a signed certificate, and a public/private key pair and assigns the randomized cohort to software 107. For example, randomized cohort generator 121 of electronic doc server 104 can generate a randomized cohort, signed certificate, and public/private key pair and assign the randomized cohort to browser 107 as described above with respect to FIG. 2. As described above, electronic doc server 104 is associated with a particular network domain.

Process 300 continues with step 3, in which electronic doc server 104 provides a reply to software 107 with the requested content and the randomized cohort, including the randomized cohort identifier, the randomized cohort timestamp, the signed certificate, and the public/private key pair as described above with respect to FIG. 2. For example, electronic doc server 104 can transmit a response including the requested image, the randomized cohort, the signed certificate, and the public/private key pair to browser 107.

Process 300 continues with step 4, in which software 107 provides a subsequent request to electronic doc server 104, which had previously issued the randomized cohort to software 107. Software 107 includes the randomized cohort identifier and an age bucket with its request. For example, electronic doc server 104 for domain ExampleImageHostingPlatform.com can receive a request from browser 107 for a second image as well as the assigned randomized cohort identifier and randomized cohort age bucket.

Optionally, the user of software 107 can choose a verification server to independently verify the privacy and/or statistical properties of the randomized cohort identifier associated with software 107 as described with respect to steps 5, 6, and 7.

Process 300 continues with step 5, in which software 107 provides its certificate to verification server 130. For example, browser 107 can provide its signed certificate, generated by randomized cohort generator 121, to verification server 130.

Process 300 continues with step 6, in which verification server 130 performs the verification process based on the certificate. For example, verification server 130 can perform the verification process based on the certificate to determine statistical and/or privacy preserving properties of the randomized cohort identifier provided in the certificate.

Optionally, verification server 130 can also authenticate the certificate provided prior to performing the verification process to determine that the randomized cohort identifier provided was assigned to the software 107 that is providing the certificate. For example, verification server 130 can use the public/private key pair to determine that the randomized cohort identifier provided was assigned to browser 107 that is providing the certificate.

Process 300 continues with step 7, in which verification server 130 provides the results of the verification process to software 107. For example, verification server 130 can output unprocessed numbers to browser 107 or a result of a statistical analysis and comparison to thresholds to determine whether statistically unusual or fraudulent activity has been detected, or whether the guaranteed level of privacy was preserved for browser 107.

Referring now to FIG. 3B, the process 350 for issuing and implementing a privacy-preserving monitoring mechanism that is used across web activity performed across different domains is performed by a central trusted domain server 140 instead of separate electronic doc servers 104. The randomized cohorts issued by trusted domain server 140 are globally-scoped. Process 350 begins with step 1, in which an initial request from software 107 is provided to electronic doc server 104. In some examples, this request can be forwarded to electronic doc server 104 through DCDS 110, which is not illustrated in FIG. 3B.

Process 350 continues with step 2, in which electronic doc server 104 forwards the request information to trusted domain server 140. For example, electronic doc server 104 can receive a request for several lines of text from its domain, ExampleTextandImageHostingPlatform.com. In this example, browser 107 has not been assigned a randomized cohort and does not provide one to electronic doc server 104, and therefore the request is an initial request.

Process 350 continues with step 3, in which trusted domain server 140 generates a randomized cohort, including a randomized cohort identifier, a randomized cohort timestamp, a certificate, and a public/private key pair and assigns the randomized cohort to software 107. For example, randomized cohort generator 142 of trusted domain server 140 can generate a randomized cohort, signed certificate, and public/private key pair and assign the randomized cohort to browser 107 as described above with respect to FIG. 2. As described above, trusted domain server 140 is not associated with one particular network domain and generates a globally-scoped randomized cohort that can be used across different domains.

Process 350 continues with step 4A, in which electronic doc server 104 provides a reply to software 107. For example, electronic doc server 104 can transmit a response including the requested text to browser 107.

Process 350 continues with step 4B, in which trusted domain server 140 provides the randomized cohort, including the randomized cohort identifier, the randomized cohort timestamp, the certificate, and the public/private key pair to software 107. For example, trusted domain server 140 can transmit the randomized cohort, the signed certificate, and the public/private key pair to browser 107.

In some implementations, steps 4A and 4B occur simultaneously. In some implementations, steps 4A and 4B occur asynchronously.

Process 350 continues with step 5, in which software 107 provides a subsequent request to electronic doc server 104. Because trusted domain server 140 has assigned a globally-scoped randomized cohort to software 107, software 107 includes the randomized cohort identifier and an age bucket with its request to electronic doc server 104. For example, electronic doc server 104 for domain ExampleTextandImageHostingPlatform.com can receive a request from browser 107 for an image as well as the assigned randomized cohort identifier and randomized cohort age bucket.

Optionally, the user of software 107 can choose a verification server to independently verify the privacy and/or statistical properties of the randomized cohort identifier associated with software 107 as described with respect to steps 6, 7, and 8.

Process 350 continues with step 6, in which software 107 provides its certificate to verification server 130. For example, browser 107 can provide its signed certificate, generated by randomized cohort generator 142, to verification server 130.

Process 350 continues with step 7, in which verification server 130 performs the verification process based on the certificate. For example, verification server 130 can perform the verification process based on the certificate to determine statistical and/or privacy preserving properties of the randomized cohort identifier provided in the certificate.

Optionally, verification server 130 can also authenticate the certificate provided prior to performing the verification process to determine that the randomized cohort identifier provided was assigned to the software 107 that is providing the certificate. For example, verification server 130 can use the public/private key pair to determine that the randomized cohort identifier provided was assigned to browser 107 that is providing the certificate. This protocol prevents the verification server 130 from considering statistics from browsers 107 with fake or stolen certificates, improving the robustness of the statistical activity data collected and reducing resources being co-opted for fraudulent use.

Process 350 continues with step 8, in which verification server 130 provides the results of the verification process to software 107. For example, verification server 130 can output unprocessed numbers to browser 107 or a result of a statistical analysis and comparison to thresholds to determine whether statistically unusual or fraudulent activity has been detected, or whether the guaranteed level of privacy was preserved for browser 107.

Figure 4:
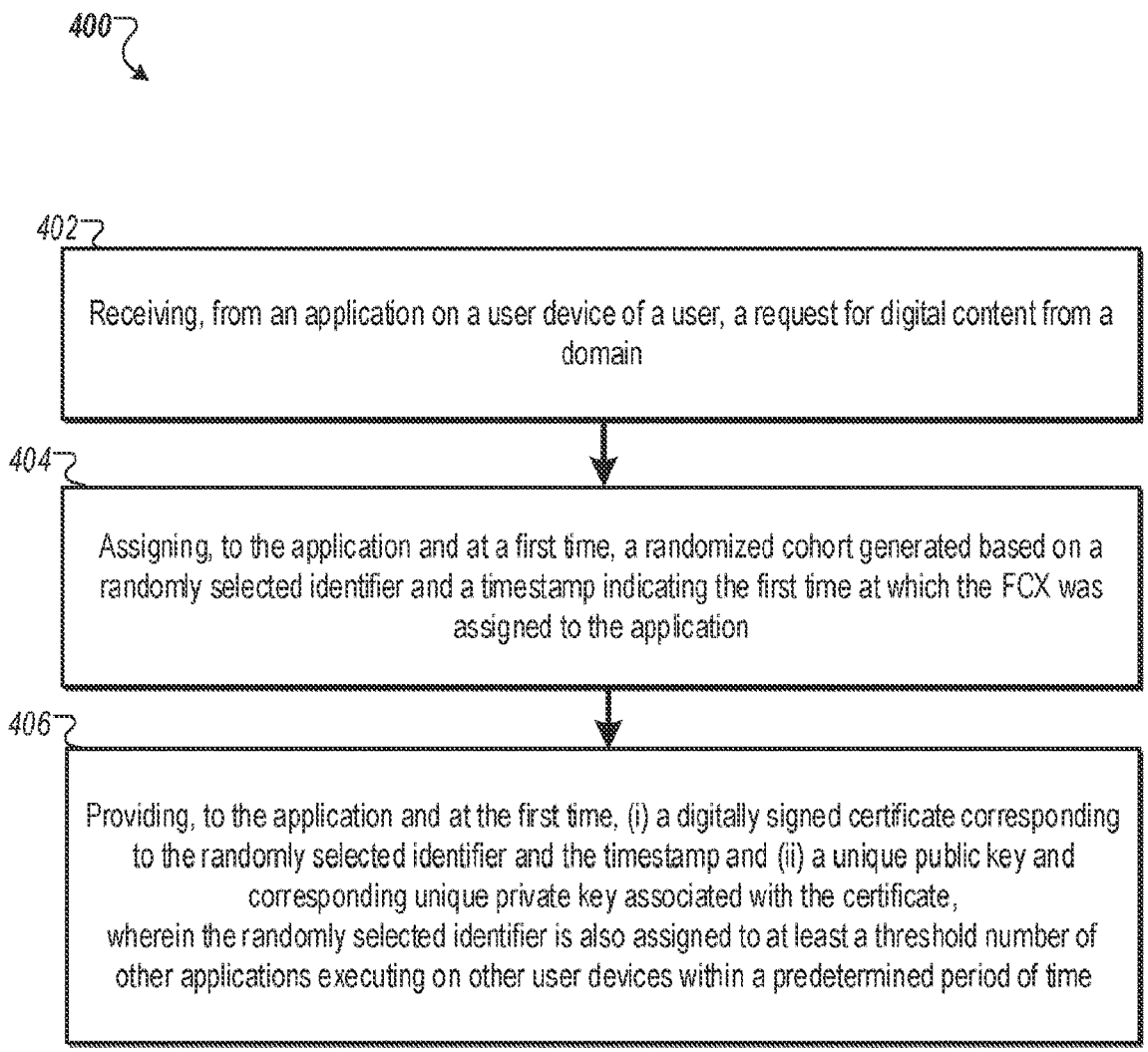
FIG. 4 is a flow diagram that illustrates an example process for issuing and implementing a privacy-preserving monitoring mechanism.

FIG. 4 is a flow diagram that illustrates an example process 400 for issuing and implementing a privacy-preserving monitoring mechanism. Operations of the process 400 can be implemented, for example, by user device 106 and/or software 107, electronic doc servers 104, DCDS 110, verification server 130, trusted domain server 140, and/or third party server 150. Operations of the process 400 can also be implemented as instructions stored on one or more computer readable media which may be non-transitory, and execution of the instructions by one or more data processing apparatus can cause the one or more data processing apparatus to perform the operations of the process 400.

Process 400 begins with receiving, from an application on a user device of a user, a request for digital content from a domain (402). For example, electronic doc server 104 can receive a request for digital content from a domain associated with electronic doc server 104 from browser 107 of user device 106 as described above with respect to FIGS. 1, 2, and 3A-3B.

Process 400 continues with assigning, to the application and at a first time, a randomized cohort generated based on a randomly selected identifier and a timestamp indicating the first time at which the randomized cohort was assigned to the application (404). For example, electronic doc server 104 can assign a locally-scoped randomized cohort associated with the domain to browser 107 as described above with respect to FIGS. 1, 2, and 3A. In another example, trusted domain server 140 can assign a globally-scoped randomized cohort that can be used to browser 107 as described above with respect to FIGS. 1, 2, and 3B.

Process 400 continues with providing, to the application and at the first time, (i) a certificate corresponding to the randomly selected identifier and the timestamp and signed with a unique public key and (ii) a unique private key corresponding to the unique public key, where the randomly selected identifier is also assigned to at least a threshold number of other applications executing on other user devices within a predetermined period of time (406). For example, electronic doc server 104 or trusted domain server 140 provides the randomized cohort and/or certificate to browser 107. If electronic doc server 104 generates a locally-scoped randomized cohort, electronic doc server 104 also provides the requested digital content to browser 107. If trusted domain server 140 generates a globally-scoped randomized cohort, electronic doc server 104 provides the requested digital content to browser 107. Step 406 can be performed as described above with respect to FIGS. 1, 2, and 3A-3B.

In some implementations, process 400 can include receiving, from the application, a second request for digital content from the domain, and providing, by the application and to the domain at a second time, a vague identifier generated based on the randomly selected identifier and a randomized cohort age bucket that indicates a range of ages of cookies that contains the age of the randomized cohort, wherein the age of the randomized cohort is calculated based on the difference between the second time and the first time. For example, the browser 107 can calculate a randomized cohort age bucket based on the randomized cohort and/or certificate provided by electronic doc server 104 or trusted domain server 140 as described above with respect to FIGS. 1, 2, and 3A-3B. In some implementations, the vague identifier includes the randomly selected identifier and the randomized cohort age bucket. In some implementations, the vague identifier includes data and parameters that are derived from the randomly selected identifier and/or the randomized cohort age bucket. For example, the vague identifier can include a parameter that was derived by applying a multiplier, adding a constant, or applying some other set of operations to the randomlu selected identifier and/or the randomized cohort age bucket. The vague identifier can also include data and parameters other than the randomly selected identifier and the randomized cohort age bucket.

In some implementations, assigning the randomized cohort to the application includes assigning, by the domain, the randomized cohort to the application, where the randomly selected identifier is assigned to the at least a threshold number of other applications by the domain, where the randomly selected identifier is a randomly generated identifier selected from among two or more randomly generated identifiers, and where the unique public key is generated by the domain. For example, electronic doc server 104 can generate and assign the randomized cohort to the browser 107 and ensure that the randomized cohort identifier is assigned to at least k−1 other browsers 107 by electronic doc server 104, where the randomized cohort identifier was selected from among two or more randomly generated identifiers, and where the unique public key is generated by electronic doc server 104 as described above with respect to FIGS. 1, 2, and 3A.

In some implementations, process 400 includes providing, by the application and to a verification system, the certificate, and verifying, by the verification system, that the randomized cohort is assigned to at least a threshold number of people. For example, verification server 130 can determine statistical and/or privacy properties of the randomized cohort indicated in the certificate as described above with respect to FIGS. 1, 2, and 3A.

In some implementations, assigning the randomized cohort to the application includes assigning, by a central server, the randomized cohort to the application, where the randomly selected identifier is assigned to the at least a threshold number of other applications, where the randomly selected identifier is a randomly generated identifier selected from among two or more randomly generated identifiers, and where the unique public key is generated by the central server. For example, trusted domain server 140 can generate and assign the randomized cohort to the browser 107 and ensure that the randomized cohort identifier is assigned to at least k−1 other browsers 107, where the randomized cohort identifier was selected from among two or more randomly generated identifiers, and where the unique public key is generated by trusted domain server 140 as described above with respect to FIGS. 1, 2, and 3B.

In some implementations, process 400 includes providing, by the application, a request for digital content from a second domain different from the first domain and the randomized cohort, in response to providing the request for digital content from the second domain, receiving, by the application and from the second domain, an attestation request that includes a challenge, and providing, by the application and to a verification system, the certificate, which triggers to cause the verification system to (i) create a vague certification comprising the randomly selected identifier, the randomized cohort age bucket, and the challenge, (ii) sign the vague certification, and (iii) provide the vague certification to the second domain, where the challenge is blinded from verification server using a blinding scheme. For example, verification server 130 can generate an anonymized certificate based on an attestation request as described above with respect to FIGS. 1, 2, and 3B.

In some implementations, process 400 includes detecting, by the domain and based on the received randomized cohort age bucket, abnormal activity associated with the randomly selected identifier and at least one of: a number of interactions associated with the randomly selected identifier, a randomized cohort age distribution, and a probability distribution associated with a particular interaction and a particular period of time. For example, analyzer 123 of electronic server 103 can detect abnormal activity associated with the randomized cohort identifier and/or a randomized cohort identifier/age bucket pair as described above with respect to FIGS. 1, 2, and 3A-3B.

The present technique thus allows tracking of internet activity (e.g. to help prevent abuse or fraud) whilst helping improve individual user privacy. The use of randomized cohort identifiers which are assigned to more than one user and age buckets rather than specific timestamps means the individual user associated with a given randomized cohort cannot be identified. The privacy of that user is therefore improved. At the same time, the use of randomized cohort identifier/age bucket pairs provides sufficient statistical information over time to identify abnormalities in internet activity potentially indicative of fraud. Furthermore, through the use of the verification system and challenges issued by third party domains, third party domains are able to verify a randomized cohort as genuine without the need to obtain identifiable information about an individual user. The present technique thus provides a robust way of combating abusive or fraudulent internet activity whilst helping to improve individual user privacy.

Figure 5:
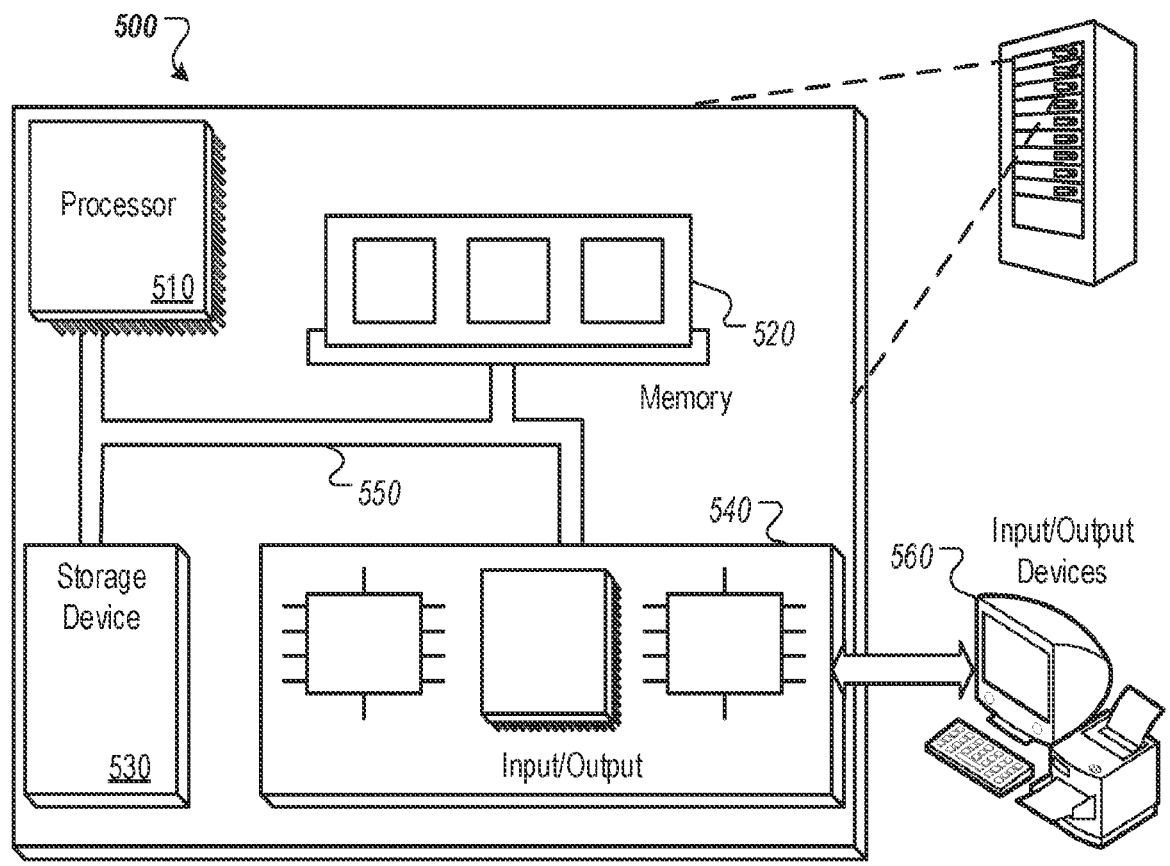
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for privacy-preserving web activity monitoring, comprising:
   receiving, from an application on a user device of a user, a request for digital content from a domain;
   assigning, to the application and at a first time, a randomized cohort constructed based on (i) a randomly selected identifier and (ii) a timestamp indicating the first time at which the randomized cohort was assigned to the application, wherein the randomly selected identifier is also assigned to at least a threshold number of other applications executing on other user devices within a predetermined period of time of the assignment of the randomly selected identifier to the application;
   providing, to the application and at the first time, (i) a digitally signed certificate corresponding to the randomly selected identifier and the timestamp and (ii) a unique public key and corresponding unique private key associated with the certificate;
   receiving, from the application and at a second time, (i) a second request for digital content from the domain and (ii) a vague identifier corresponding to the randomly selected identifier and a randomized cohort age bucket that indicates a range of ages of cookies that contains the age of the randomized cohort, wherein the age of the randomized cohort is calculated based on a difference between the second time and the first time, and wherein the randomized cohort age bucket obfuscates the age of the randomized cohort;
   receiving, from the application and after the second time, subsequent requests for digital content from the domain, wherein each subsequent request includes the vague identifier to anonymize the user; and
   providing, to the application, the requested digital content in response to each subsequent request.

2. The method of claim 1, wherein assigning, to the application, a randomized cohort comprises:
   assigning, by the domain, the randomized cohort to the application, and
   wherein the randomly selected identifier is assigned to the at least a threshold number of other applications,
   wherein the randomly selected identifier is a randomly generated identifier selected from among two or more randomly generated identifiers, and
   wherein the unique public key is generated by the domain.

3. The method of claim 1, wherein assigning, to the application, a randomized cohort comprises:
   assigning, by a central server, the randomized cohort to the application,
   wherein the randomly selected identifier is assigned to the at least a threshold number of other applications,
   wherein the randomly selected identifier is a randomly generated identifier selected from among two or more randomly generated identifiers, and
   wherein the unique public key is generated by the central server.

4. The method of claim 1, further comprising:
   providing, by the application, a request for digital content from a second domain different from the domain and the randomized cohort;
   in response to providing the request for digital content from the second domain, receiving, by the application and from the second domain, an attestation request that includes a challenge; and
   providing, by the application and to a verification system, the digitally signed certificate, which triggers the verification system to (i) create a vague certification comprising the randomly selected identifier, the randomized cohort age bucket, and the challenge, (ii) sign the vague certification, and (iii) provide the vague certification to the second domain,
   wherein the challenge is blinded from the verification system using a blinding scheme.

5. The method of claim 1, further comprising:
providing, by the application and to a verification system, the digitally signed certificate; and
verifying, by the verification system, that the randomly selected identifier is assigned to at least the threshold number of applications.

6. The method of claim 1, further comprising:
detecting, by the domain and based on the randomized cohort age bucket, abnormal activity associated with the randomly selected identifier and at least one of: a number of interactions associated with the randomly selected identifier, a randomized cohort age distribution, and a probability distribution associated with a particular interaction and a particular period of time.

7. A system comprising:
one or more processors; and
one or more memory elements including instructions that, when executed, cause the one or more processors to perform operations including:
 receiving, from an application on a user device of a user, a request for digital content from a domain;
 assigning, to the application and at a first time, a randomized cohort constructed based on (i) a randomly selected identifier and (ii) a timestamp indicating the first time at which the randomized cohort was assigned to the application, wherein the randomly selected identifier is also assigned to at least a threshold number of other applications executing on other user devices within a predetermined period of time of the assignment of the randomly selected identifier to the application;
 providing, to the application and at the first time, (i) a digitally signed certificate corresponding to the randomly selected identifier and the timestamp and (ii) a unique public key and corresponding unique private key associated with the certificate;
 receiving, from the application and at a second time, (i) a second request for digital content from the domain and (ii) a vague identifier corresponding to the randomly selected identifier and a randomized cohort age bucket that indicates a range of ages of cookies that contains the age of the randomized cohort, wherein the age of the randomized cohort is calculated based on a difference between the second time and the first time, and wherein the randomized cohort age bucket obfuscates the age of the randomized cohort;
 receiving, from the application and after the second time, subsequent requests for digital content from the domain, wherein each subsequent request includes the vague identifier to anonymize the user; and
 providing, to the application, the requested digital content in response to each subsequent request.

8. The system of claim 7, wherein assigning, to the application, a randomized cohort comprises:
assigning, by the domain, the randomized cohort to the application, and
wherein the randomly selected identifier is assigned to the at least a threshold number of other applications,
wherein the randomly selected identifier is a randomly generated identifier selected from among two or more randomly generated identifiers, and
wherein the unique public key is generated by the domain.

9. The system of claim 7, wherein assigning, to the application, a randomized cohort comprises:
assigning, by a central server, the randomized cohort to the application,
wherein the randomly selected identifier is assigned to the at least a threshold number of other applications,
wherein the randomly selected identifier is a randomly generated identifier selected from among two or more randomly generated identifiers, and
wherein the unique public key is generated by the central server.

10. The system of claim 7, the operations further comprising:
providing, by the application, a request for digital content from a second domain different from the domain and the randomized cohort;
in response to providing the request for digital content from the second domain, receiving, by the application and from the second domain, an attestation request that includes a challenge; and
providing, by the application and to a verification system, the digitally signed certificate, which triggers the verification system to (i) create a vague certification comprising the randomly selected identifier, the randomized cohort age bucket, and the challenge, (ii) sign the vague certification, and (iii) provide the vague certification to the second domain,
wherein the challenge is blinded from the verification system using a blinding scheme.

11. The system of claim 7, the operations further comprising:
providing, by the application and to a verification system, the digitally signed certificate; and
verifying, by the verification system, that the randomly selected identifier is assigned to at least the threshold number of applications.

12. The system of claim 7, the operations further comprising:
detecting, by the domain and based on the randomized cohort age bucket, abnormal activity associated with the randomly selected identifier and at least one of: a number of interactions associated with the randomly selected identifier, a randomized cohort age distribution, and a probability distribution associated with a particular interaction and a particular period of time.

13. A non-transitory computer storage medium encoded with instructions that when executed by a distributed computing system cause the distributed computing system to perform operations comprising:
receiving, from an application on a user device of a user, a request for digital content from a domain;
assigning, to the application and at a first time, a randomized cohort constructed based on (i) a randomly selected identifier and (ii) a timestamp indicating the first time at which the randomized cohort was assigned to the application, wherein the randomly selected identifier is also assigned to at least a threshold number of other applications executing on other user devices within a predetermined period of time of the assignment of the randomly selected identifier to the application;
providing, to the application and at the first time, (i) a digitally signed certificate corresponding to the randomly selected identifier and the timestamp and (ii) a unique public key and corresponding unique private key associated with the certificate;
receiving, from the application and at a second time, (i) a second request for digital content from the domain and (ii) a vague identifier corresponding to the randomly selected identifier and a randomized cohort age bucket that indicates a range of ages of cookies that contains the age of the randomized cohort, wherein the age of the randomized cohort is calculated based on a difference between the second time and the first time, and wherein the randomized cohort age bucket obfuscates the age of the randomized cohort;

receiving, from the application and after the second time, subsequent requests for digital content from the domain, wherein each subsequent request includes the vague identifier to anonymize the user; and providing, to the application, the requested digital content in response to each subsequent request.

14. The non-transitory computer storage medium of claim 13, wherein assigning, to the application, a randomized cohort comprises:

assigning, by the domain, the randomized cohort to the application, and wherein the randomly selected identifier is assigned to the at least a threshold number of other applications, wherein the randomly selected identifier is a randomly generated identifier selected from among two or more randomly generated identifiers, and wherein the unique public key is generated by the domain.

15. The non-transitory computer storage medium of claim 13, wherein assigning, to the application, a randomized cohort comprises:

assigning, by a central server, the randomized cohort to the application, wherein the randomly selected identifier is assigned to the at least a threshold number of other applications, wherein the randomly selected identifier is a randomly generated identifier selected from among two or more randomly generated identifiers, and wherein the unique public key is generated by the central server.

16. The non-transitory computer storage medium of claim 13, the operations further comprising:

providing, by the application, a request for digital content from a second domain different from the domain and the randomized cohort;

in response to providing the request for digital content from the second domain, receiving, by the application and from the second domain, an attestation request that includes a challenge; and providing, by the application and to a verification system, the digitally signed certificate, which triggers the verification system to (i) create a vague certification comprising the randomly selected identifier, the randomized cohort age bucket, and the challenge, (ii) sign the vague certification, and (iii) provide the vague certification to the second domain, wherein the challenge is blinded from the verification system using a blinding scheme.

17. The non-transitory computer storage medium of claim 13, the operations further comprising:

providing, by the application and to a verification system, the digitally signed certificate; and verifying, by the verification system, that the randomly selected identifier is assigned to at least the threshold number of applications.

18. The non-transitory computer storage medium of claim 13, wherein the operations comprise:

detecting, by the domain and based on the randomized cohort age bucket, abnormal activity associated with the randomly selected identifier and at least one of: a number of interactions associated with the randomly selected identifier, a randomized cohort age distribution, and a probability distribution associated with a particular interaction and a particular period of time.

* * * * *